United States Patent
Sumi et al.

(10) Patent No.: US 6,554,490 B1
(45) Date of Patent: Apr. 29, 2003

(54) ELECTRONIC APPARATUS HAVING COMMUNICATION FUNCTION USING DETACHABLE COMMUNICATION CABLE, CAPABLE OF REDUCING POWER CONSUMPTION AND STABLE OPERATION

(75) Inventors: Kazuyuki Sumi, Nara (JP); Hirohisa Wakai, Habikino (JP); Takashi Nishimura, Tenri (JP); Yuji Ichikawa, Tenri (JP); Masafumi Takahashi, Tenri (JP); Daisuke Nakano, Tenri (JP); Toru Ueda, Soraku-gun (JP); Kazuhito Nagura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/580,478

(22) Filed: May 26, 2000

(30) Foreign Application Priority Data

May 26, 1999 (JP) .............................................. 11-146143
Jun. 23, 1999 (JP) .............................................. 11-176201

(51) Int. Cl.$^7$ ................................................. G02B 6/36
(52) U.S. Cl. .......................................... 385/88; 385/139
(58) Field of Search ........................... 385/75, 88–94, 385/139, 147; 439/577

(56) References Cited

U.S. PATENT DOCUMENTS 4,869,566 A * 9/1989 Juso et al. ............. 250/227.28
6,293,706 B1 * 9/2001 Strike et al. ................. 385/147

FOREIGN PATENT DOCUMENTS

| JP | 2-53125 | 2/1990 | | |
|----|---------|--------|---|---|
| JP | 7-57819 | 3/1995 | | |
| JP | 07057819 A | * | 3/1995 | ........... H01R/13/64 |
| JP | 10-70508 | 3/1998 | | |
| JP | 10070508 A | * | 3/1998 | ........... H04B/10/00 |

* cited by examiner

Primary Examiner—Akm E. Ullah
Assistant Examiner—Michelle R. Connelly-Cushwa
(74) Attorney, Agent, or Firm—Edwards & Angell, LLP; David G. Conlin; John J. Penny, V (57) ABSTRACT

An electronic apparatus comprising a detecting unit, a communications unit, and a power control circuit. The power control circuit supplies power to a communication circuit unit based upon a result of detection of the detecting unit.

18 Claims, 10 Drawing Sheets

ELECTRONIC APPARATUS HAVING COMMUNICATION FUNCTION USING DETACHABLE COMMUNICATION CABLE, CAPABLE OF REDUCING POWER CONSUMPTION AND STABLE OPERATION

BACKGROUND OF THE INVENTION

1. Field of the Invention

The present invention relates to an electronic apparatus and, more specifically, to an electronic apparatus having a function of communication using a fiber optic cable or an electric cable, which uses a detachable communication cable.

2. Description of the Background Art

Among digital video camera (digital VTRs with camera; digital video camera, hereinafter referred to as DVC) recording motion pictures, some have a function of transferring digital data at high speed to other electronic apparatuses, by connecting electronic apparatuses with each other by a cable, utilizing a standard such as IEEE1394.

In most cases, such electronic apparatuses are used as portable apparatuses. Therefore, generally, such an apparatus is used for recording pictures or the like while it is not connected to a cable, and communication with other apparatus is established by connecting a cable when communication becomes necessary.

An electric cable having a 4-pin or 6-pin terminal has been standardized as a communication medium in accordance with IEEE1394. As to the optical fiber, a standard specifying use of two optical fibers has been proposed. Further, mainly for portable apparatuses, study has been made for transferring signals in accordance with IEEE1394 standard over one optical fiber.

According to IEEE1394, when an electronic apparatus has a plurality of ports, it is necessary for the electronic apparatus to function as a repeater to relay a signal from one electronic apparatus to another electronic apparatus. Therefore, power supply to a physical layer circuit is adapted to be supplied constantly.

In an electronic apparatus not mainly used for communication, constant power supply to the physical layer circuit when the cable is not connected is unnecessary. Though IEEE1394 suggests possibility of considerable reduction of power consumption of a communication circuit when the communication cable is not connected, specific method thereof is not specified in the standard.

Further, a receptacle specified in IEEE1394 does not have any mechanism for detecting whether a plug is inserted to/removed from the receptacle. Therefore, it is necessary to detect voltage levels of signal lines in accordance with IEEE1394, to obtain information of connection between the plug and the receptacle from the result of analysis. This means that power must be supplied constantly to the communication circuit to keep the circuit in operation.

Here is the problem that even when the apparatus is fully disconnected from a communication circuit and the communication circuit is not in use, power consumption by the communication circuit portion cannot be made zero. In a portable apparatus such as a DVC, the communication circuit portion operates not only at the time of communication but also at the time of recording, for example, and hence power is consumed at the communication circuit portion which is essentially not in use. In such portable apparatus which are in most cases battery-operated, this leads to shorter discharge life of the battery, and the recordable time in recording operation is undesirably made shorter.

Generally, not only in DVCs but also in battery operated portable apparatuses, wasteful power consumption at the communication circuit portion not at the time of communication shortens discharge time of the battery, making it difficult to ensure long operation time of the apparatuses.

Therefore, reduction in power consumption of the electronic apparatus is an important problem.

As one technique related to lower power consumption of an electronic apparatus, Japanese Patent Laying-Open No. 7-57819 discloses a technique in which power supply of the electronic apparatus as a whole is shut off, when a cable is not connected to the electronic apparatus.

Though it is possible to control power supply to the overall electronic apparatus by the technique described in Japanese Patent Laying-Open No. 7-57819, it is not possible to reduce power consumption by the communication circuit portion only of the electronic apparatus, or to control power on port by port basis in accordance with IEEE1394, for example.

Japanese Patent Laying-Open No. 10-70508 discloses another related technique providing both spatial optical communication function and optical communication function through fiber optic cable, in which driving power for optical communication is increased to perform spatial optical communication when a fiber optic cable is not connected, and driving power for optical communication is reduced to perform optical communication through an optical fiber when the fiber optic cable is connected.

The technique described in Japanese Patent Laying-Open No. 10-70508 is applicable when spatial optical communication and optical communication through fiber optic cable are switched. The technique, however, cannot directly be applied to a DVC, for example, of which communication with other apparatus is established only through a communication cable.

In addition to the problem of power consumption, there is another problem of stabilizing operation when electronic apparatuses in operation are to be connected with each other by a communication cable.

Generally, when electronic apparatuses in operation are to be connected to each other by a communication cable, it is not guaranteed that the ground (reference potential) of an apparatus is at the same potential as the ground of the other apparatus to be connected, immediately before connection. Accordingly, when signal electrodes of the apparatuses contact with each other before the ground electrodes are connected to each other, it is possible that signal electrodes of the two apparatuses may contact with excessive potential difference therebetween. Therefore, a receiving device or a transmitting device may possibly be damaged.

Figure 10:
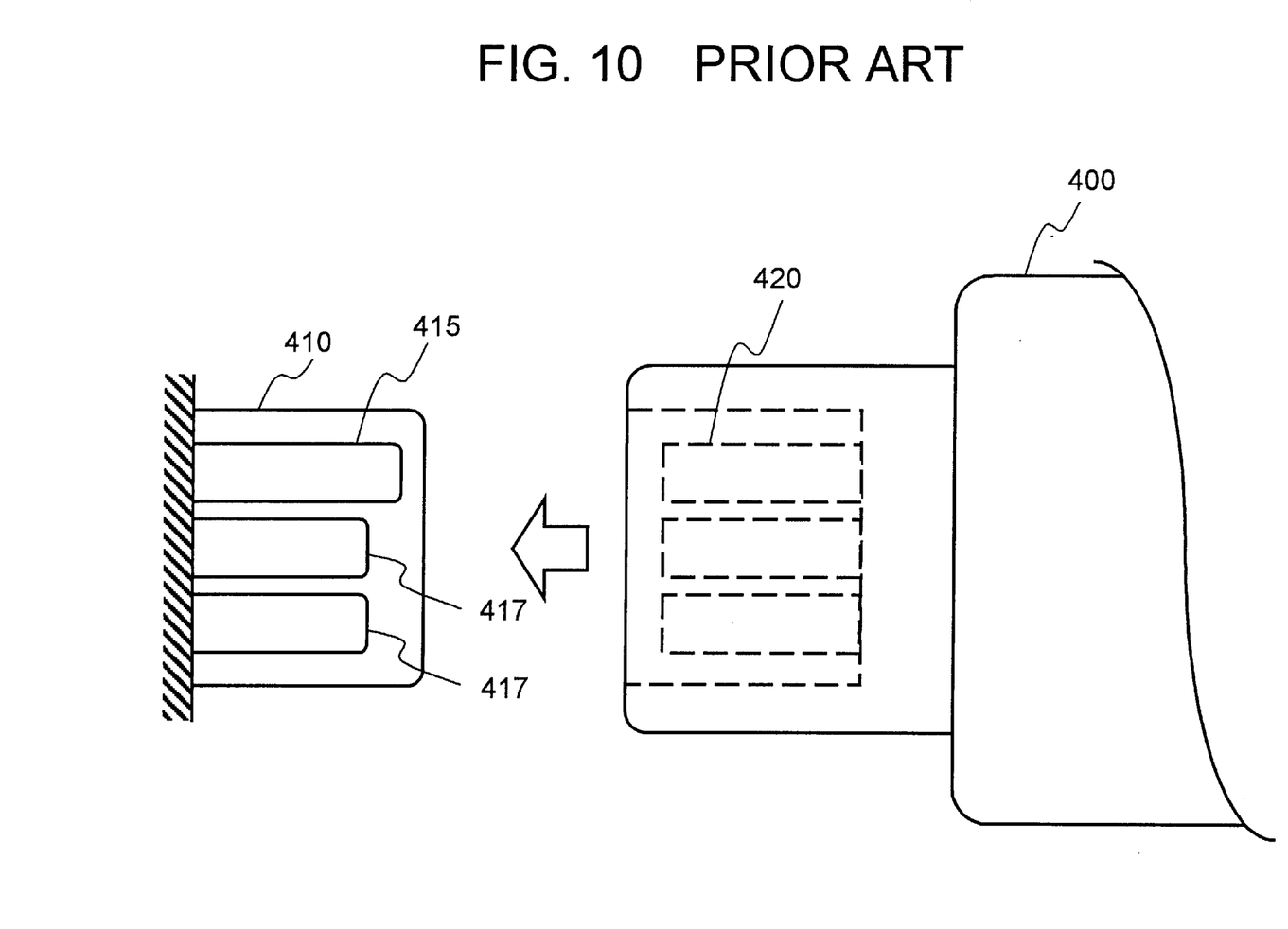
FIG. 10 represent appearances of a plug and a receptacle standardized in accordance with IEEE1394.

FIG. 10 shows shapes of a plug and a receptacle in compliance with IEEE13344 standard.

Referring to FIG. 10, a receptacle 410 includes a power supply related electrode 415, and a signal electrode 417. Power supply related electrode 415 is positioned close to a tip end portion of receptacle 410, whereas signal electrode 417 is placed recessed therefrom. A plug 400 includes plug side electrodes 420 corresponding to respective electrodes of receptacle 410.

Therefore, when plug 400 is connected to receptacle 410, power supply related electrode 415 comes to be in contact with the corresponding plug side electrode 420 before signal electrode 417 comes into contact with the corresponding plug side electrode 420. Therefore, between the apparatuses, the ground (reference potential) and the power supply are first connected, and after the apparatuses are ready to have the signal lines connected to each other, the signal related electrode 417 comes to be in contact with the plug side electrode 420, establishing safe connection of the signal line. Accordingly, problems such as an unexpected application of excessive voltage to the receiving device or the transmitting device or malfunction caused by unexpected data input to a state transition circuit in accordance with IEEE1394 can be solved.

Generally, when electronic apparatuses in operation are to be connected with each other by a communication cable, unexpected data may possibly be input as a noise to the receiving side dependent on the order of connection of a plurality of signal lines, causing malfunction of a communication circuit.

In order to solve such a problem, a technique for preventing malfunction at the time of connection between the plug and the receptacle is described in Japanese Patent Laying-Open No. 2-53125.

Figure 11:
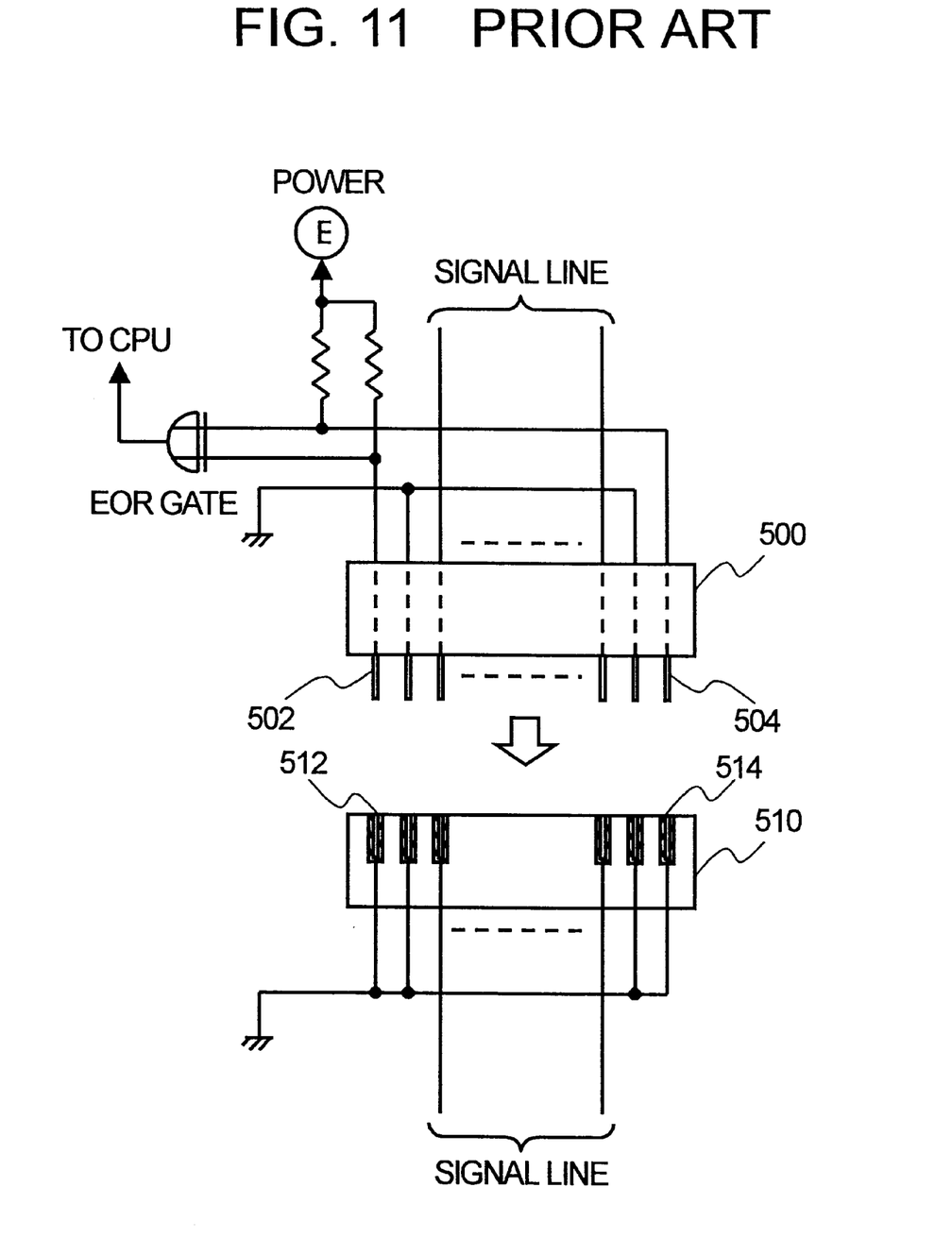
FIG. 11 represents configurations of a plug and a receptacle in accordance with the prior art.

FIG. 11 shows configurations of a plug and a receptor disclosed in Japanese Patent Laying-Open No. 2-53125.

Referring to FIG. 11, in a plug 500 and a receptacle 510, electrodes are arranged aligned in the direction vertical to the direction of insertion. At opposing ends of the plug and the receptacle, electrodes 512 and 514 for detecting connection and corresponding plug side electrodes 502 and 504 are provided respectively, separate from the electrodes for transmitting signals. By this configuration, it becomes possible to determine, when voltage levels of plug electrodes 502 and 504 do not match, that connection is now being established, and hence it becomes possible to interrupt operations of the electronic apparatuses and to prevent malfunction.

Development has been made to reduce area occupied by a receptacle of an apparatus by applying a miniature concentric plug (hereinafter also referred to as a mini plug) as an electric plug in accordance with IEEE1394 standard, for example, and providing an optical mini jack (OMJ) used commonly for optical and electric applications as a corresponding receptacle.

The structure of the OMJ will be described in detail later. In the OMJ, there is provided a terminal corresponding to an electric mini plug, and in addition, a photoreceptor circuit for processing an optical signal and a light emitting circuit (these circuits will be generally referred to as optical front-end circuit in the following) operable when a fiber optic plug having the same shape as the mini plug is inserted. Therefore, one receptacle can be commonly used to receive an optical plug and an electric plug. As a result, it becomes unnecessary to provide two receptacles for an optical signal and an electric signal, enabling reduction in size of the apparatus.

Further, study has been made to transfer signals in accordance with IEEE1394 standard over one optical fiber, on the premise that a small receptacle such as the OMJ is applied.

In such an electric mini plug and in the OMJ, electrodes are arranged aligned parallel to the direction of insertion, as will be described in detail later. Such arrangement of electrodes prevents application of the prior art shown in FIG. 11, and therefore there is a possibility that signal terminals may be in contact with each other before the ground terminals are connected, during the operation of insertion. Therefore, it is possible that signal electrodes of two apparatuses may be brought into contact with excessive potential difference therebetween. If a transmitting/receiving device having low breakdown voltage is used, such a device may be damaged.

There is still another problem. When an electric mini plug and an OMJ receptacle, for example, to be fitted in the mini plug are applied to the communication standard such as IEEE1394, it is the case that electrodes of the plug are brought into contact with electrodes other than the corresponding electrodes of the receptacle in the process of insertion, before the plug is fully inserted and connected to the corresponding electrodes of the receptacle, if the mini plug having such an electrode arrangement is inserted to the receptacle.

In the IEEE1394 standard, such an event in that plug electrodes are brought into contact with electrodes other than the corresponding electrodes of the receptacle when the plug is inserted is not considered. Therefore, when a mini plug represented by the OMJ is used, unexpected data may possibly be input, causing malfunction, as electrodes not corresponding to each other are brought into contact when the plug is inserted, affecting the communication circuit.

More specifically, though the plug and the receptacle having such shapes as shown in FIG. 11 solve the general problem of malfunction, the mini plug and the OMJ having such shapes in that electrodes are arranged parallel to the direction of insertion cannot solve these problems.

Further, in the plug and the receptacle defined by IEEE1394 shown in FIG. 10, positional relation between the power supply terminal and the signal terminal are adjusted to prevent the above described problems of malfunction or electric breakdown. The receptacle, however, occupies a large area on the surface of the apparatus. A receptacle considering common use with an electric cable, when an optical fiber is used, is not defined. Therefore, it is necessary to provide separate receptacles for optical signals and the electric signals. From these points, the plug and the receptacle defined by IEEE1394 shown in FIG. 10 are not suitable for application to a small portable apparatus.

SUMMARY OF THE INVENTION

An object of the present invention is to reduce power consumption of an electronic apparatus which communicates with other apparatus using a communication cable and capable of limited communication with the other apparatuses.

Another object of the present invention is to realize stable operation at the time of connection, in an electronic apparatus using a mini plug, which allows reduction in size and common use for optical and electric applications, and a fitting receptacle.

Briefly stated, the present invention provides an electronic apparatus to and from which a communication cable is attached and detached, including a detecting unit, a communication unit and a power control unit.

The detection unit detects state of connection of the communication cable. The communication unit communicates signals with the communication cable. The power control unit controls power supply to the communication unit, based on the result of detection by the detecting unit.

According to another aspect, the present invention provides an electronic apparatus to and from which a communication cable can be attached and detached, including a receptacle, a detecting unit, a communication unit and a switch unit.

The receptacle is provided to receive a plug of the communication cable inserted thereto. The detecting unit detects the state of insertion of the plug to the receptacle. The communication unit communicates signals with the communication cable. The switch unit is provided between the receptacle and the communication unit, and operates based on the result of detection by the detecting unit.

Therefore, an advantage of the present invention is that, in an electronic apparatus having the function of attaching/detaching a communication cable, power supply to the communication unit is stopped and power consumption is reduced except in a communication period in which the communication cable is connected. Therefore, the time of battery discharge of a portable apparatus can be made longer, and the operation time of the apparatus can be made longer.

Further, connection between the receptacle and the communication unit is established after insertion of the plug into the receptacle is detected. Therefore, electric breakdown of the receiving device or the transmitting device at the time of inserting the plug can be prevented. Further, malfunction at the communication unit caused by undesirable contact with other terminal in the course of inserting the plug can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the figures.

First Embodiment

In the first embodiment, a configuration of an electronic apparatus allowing reduction in power consumption will be described.

Figure 1:
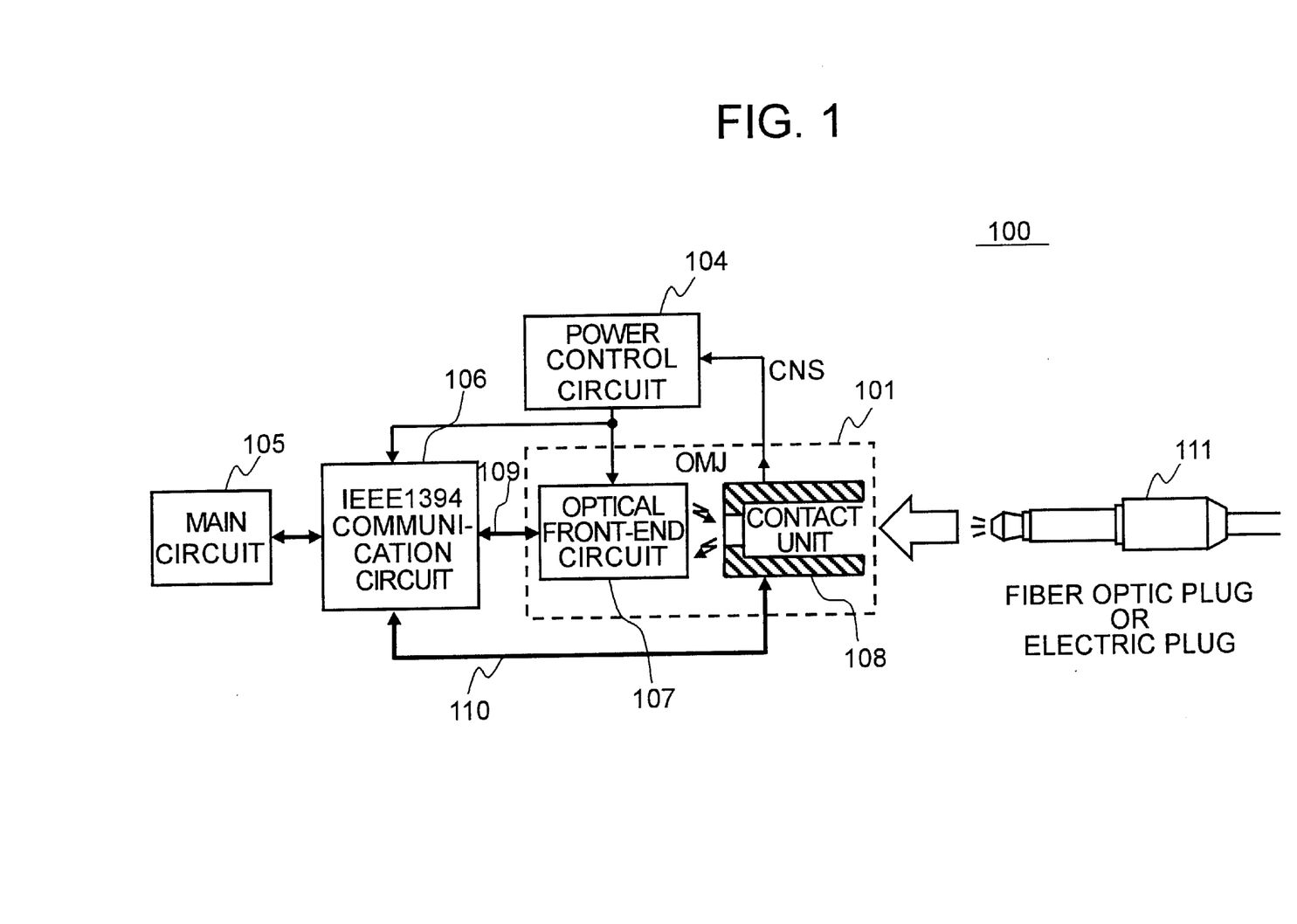
FIG. 1 is a block diagram representing a configuration of an electronic apparatus 100 in accordance with a first embodiment of the present invention.
Figure 2:
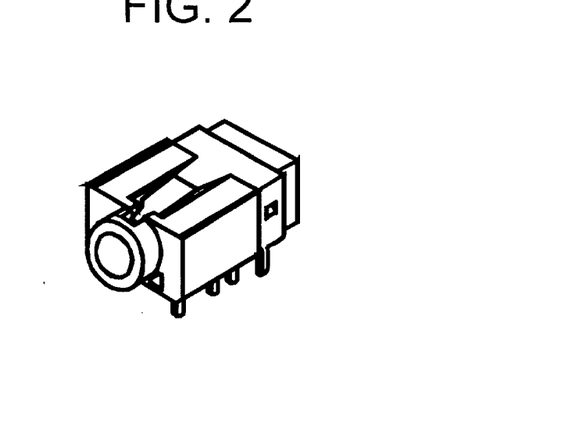
FIG. 2 shows an appearance of an OMJ.

Referring to FIG. 1, an electronic apparatus 100 in accordance with the first embodiment communicates signals with other apparatuses through an optical fiber or an electric cable, by means of a communication cable plug 111 inserted to a receptacle 101, to which the OMJ is applied. The appearance of the OMJ used as the receptacle is as shown in FIG. 2. In the following, the receptacle may also be simply referred to as OMJ.

Receptacle 101 includes a contact unit 108 which is brought into contact with an electric plug inserted thereto, and an optical front-end circuit 107 including a light emitting device, a driving circuit therefor, a photoreceptor device and an amplifying circuit therefor, corresponding to a fiber optic cable.

Figure 3A:
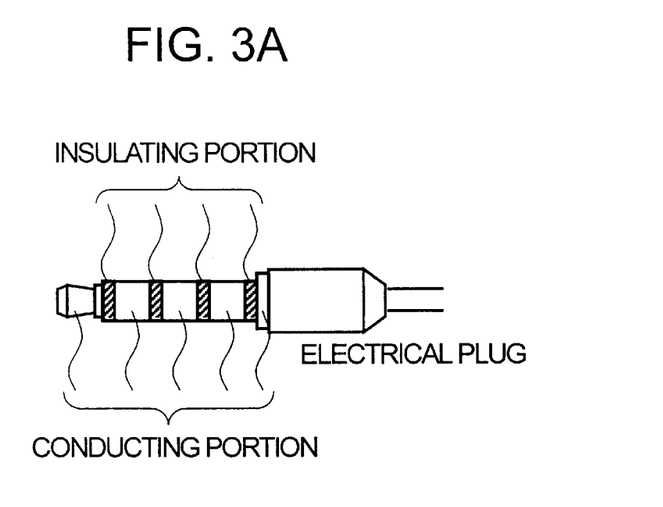
FIGS. 3A and 3B show appearances of an electric cable plug and a fiber optical plug used corresponding to the OMJ.
Figure 3B:
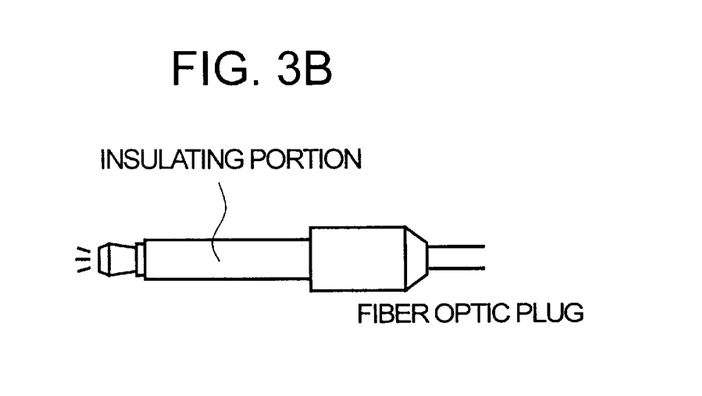

Therefore, the electronic apparatus in accordance with the present invention allows a user to selectively use either an electric cable plug and a fiber optic plug having the same shape, as shown in FIGS. 3A and 3B.

An OMJ provided with either a photoreceptor unit or a light emitting unit in the receptacle has already been adopted in a portable MD recorder, for example, and already implemented in products and on the market, for digital audio communication. In the present invention, it is assumed that a plug having such a shape as shown in FIG. 3A is used to cope with the OMJ, when an electric signal in accordance with IEEE1394 standard is to be handled.

Referring to FIG. 3A, at a tip end portion of the electric cable plug, conductor portions and insulating portions are arranged alternately, and the plurality of conductor portions arranged along the direction of insertion constitute electrodes.

FIG. 3B shows the appearance of the fiber optic plug having the same shape as the electric cable plug shown in FIG. 3A.

Again referring to FIG. 1, electronic apparatus 100 includes a receptacle 101 receiving a plug inserted thereto, an IEEE1394 communication circuit 106 for communication in accordance with the IEEE1394 standard through receptacle 101, and a main circuit 105.

IEEE1394 communication circuit 106 is a circuit or an LSI processing a protocol for transferring signals in accordance with IEEE1394 over one optical fiber. Main circuit 105 is the main circuit portion of the electronic apparatus and, when the electronic apparatus is a DVC, it includes a recording and reproducing circuit. Details of main circuit 105 will not be given here.

Electric contact unit 108 in the OMJ will be described.

Figure 4A:
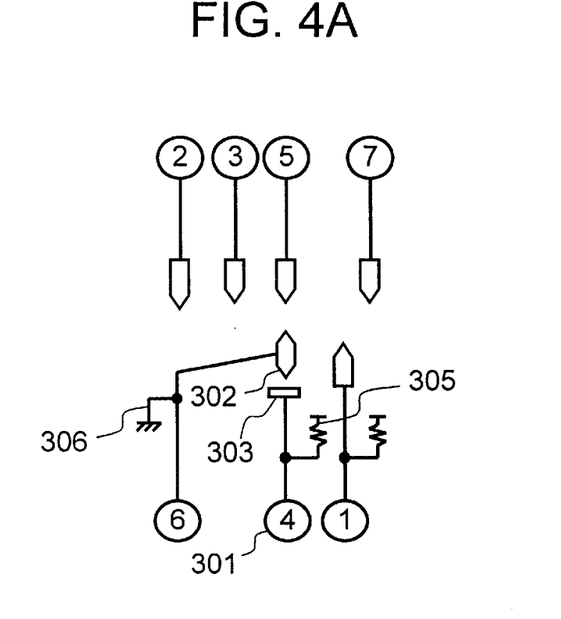
FIGS. 4A and 4B represent configurations of electric contact unit of the OMJ.
Figure 4B:
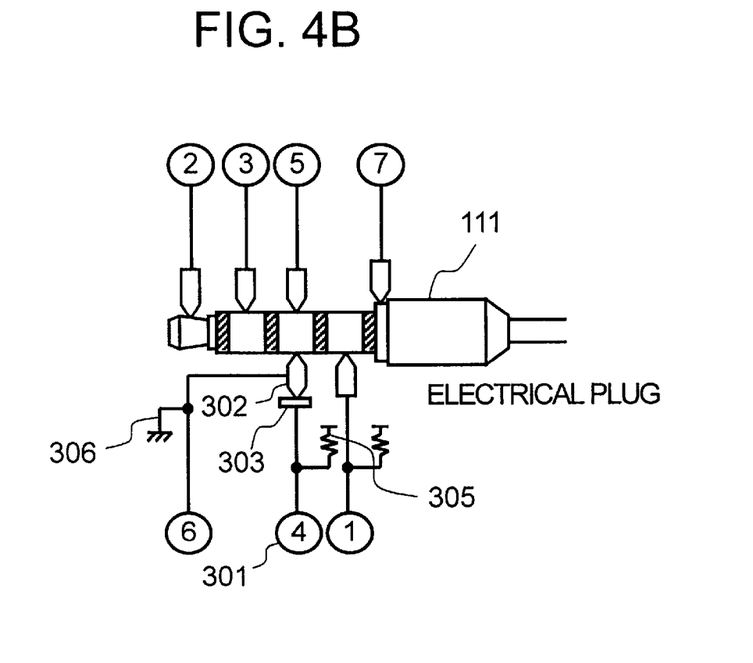

FIG. 4A shows the plug not inserted to the OMJ, and FIG. 4B shows the plug inserted to the OMJ.

Referring to FIG. 4A, the contact unit includes a movable contact 302 and a fixed contact 303. The fixed contact 303 is connected to the fourth terminal 301. Terminal 301 is pulled up to a power supply node 305 through an internal resistance of the OMJ, and therefore, when the plug is not inserted, terminal 301 provides the same level as the pulled-up power supply potential, that is, H level.

Next, referring to FIG. 4B, when the plug is inserted to the OMJ, movable contact 302 is moved by the plug, and movable contact 302 is electrically connected to fixed contact 303. Thus, terminal 301 outputs a signal at the same potential level as ground node 306, that is, L level.

In FIGS. 4A and 4B, the signal output from terminal 301 corresponds to the connection detecting signal CNS of FIG. 1.

More specifically, the connection detecting signal CNS attains to the L level when the plug is inserted to contact unit 108, and it attains to the H level when the plug is removed, that is, when the plug is not inserted.

In this embodiment, an example in which the OMJ is used with an optical fiber will be described. As transmission of signals over an electric cable and an optical fiber using plugs of the same shape is handled here, the operation at the contact unit 108 is the same no matter which is used. Therefore, the embodiment of the present invention does not differ when the plug for an electric cable is used or when a plug for an optical fiber is used.

IEEE1394 communication circuit 106 and receptacle 101 are connected by signal lines 109 and 110. When the plug for an optical fiber is connected, communication is established through signal line 109 between IEEE1394 communication circuit 106 and the optical front-end circuit. When a plug for an electric cable is connected, communication is established through signal line 110 between IEEE1394 communication circuit 106 and contact unit 108.

Electronic apparatus 100 further includes a power control circuit 104. Power control circuit 104 operates in response to the connection detecting signal CNS, and supplies power to IEEE1394 communication circuit 106 and optical front-end circuit 107 when the connection detecting signal CNS is at the L level. When the plug 111 is removed from OMJ101 and the connection detecting signal CNS is at the H level, communication to other apparatus is unnecessary, and therefore, power supply to IEEE1394 communication circuit 106 and optical front-end circuit 107 is stopped.

Power control circuit 104 may be implemented by a circuit using a transistor and a resistor.

Figure 5:
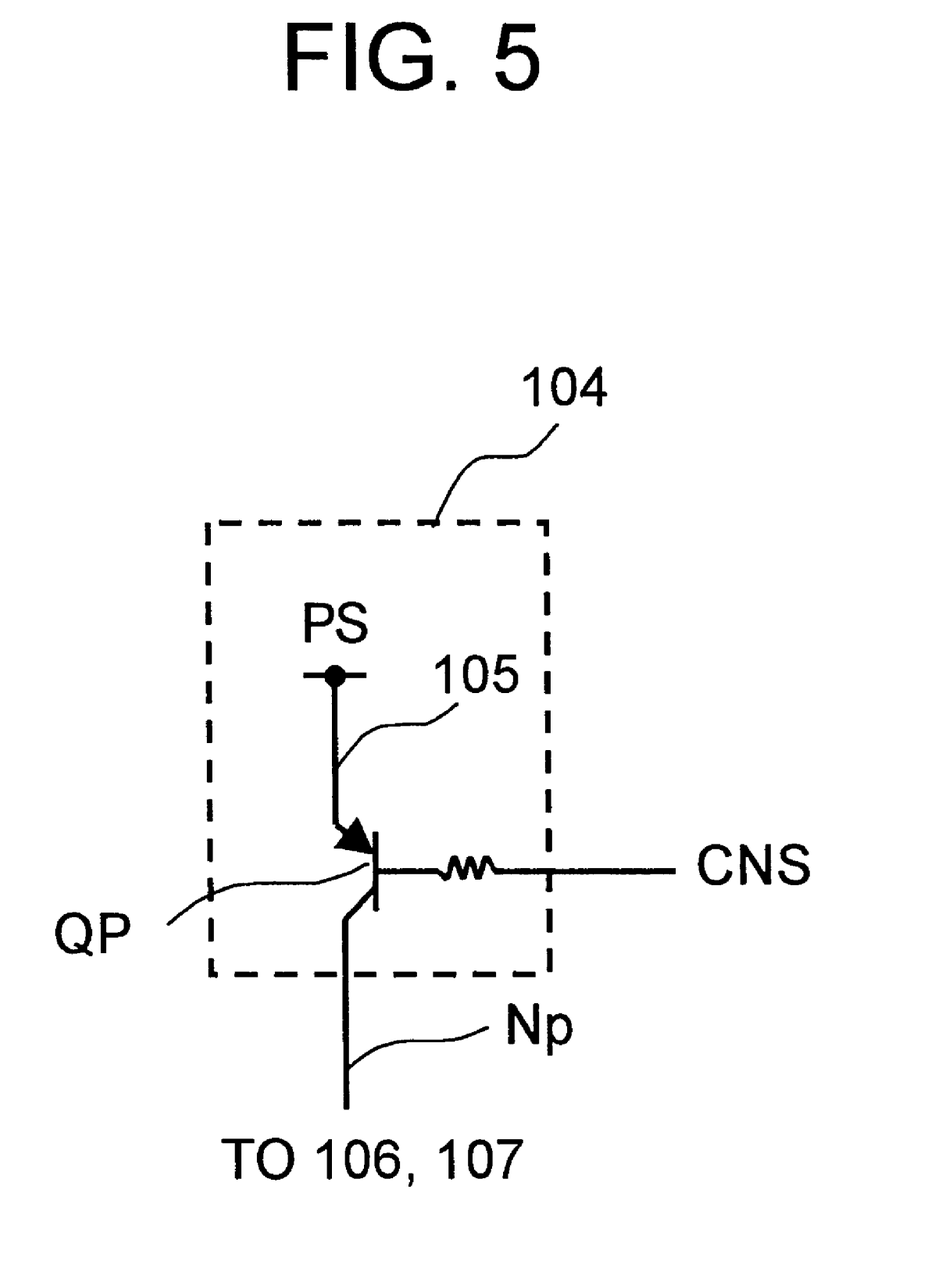
FIG. 5 is a circuit diagram showing an example of a configuration of a power control circuit.

Referring to FIG. 5, power control circuit 104 includes a transistor QP connected between a power supply node 105 and a node Np. Node Np is connected to IEEE1394 communication circuit 106 and optical front-end circuit 107. Transistor QP receives at its base the connection detecting signal CNS. Because of this structure, when the connection detecting signal is at the L level, that is, when the cable is connected to the receptacle, base current flows in transistor QP, and the power supply current is supplied, as corrector current of transistor QP, to IEEE1394 communication circuit 106 and optical front-end circuit 107 through node Np.

When the connection detecting signal CNS is at the H level, that is, when the cable is not connected to the receptacle, transistor QP is off, and therefore, the power supply current is not supplied to node Np. Therefore, it is possible to detect whether the communication cable is connected to the electronic apparatus or not by the connection detecting signal CNS, and it is possible to stop power supply to the communication circuit portion when the electronic apparatus is separated from a communication network, whereby power consumption can be reduced.

Further, as receptacle 101 has the function of detecting whether the communication cable is connected or not in itself, the connection detecting signal CNS for performing power control can be obtained directly, without the necessity of providing a new detecting unit. This enables reduction in the number of components on the circuit board and area of occupation.

Second Embodiment

In the second embodiment, a configuration where one electronic apparatus has a plurality of communication ports will be described.

Figure 6:
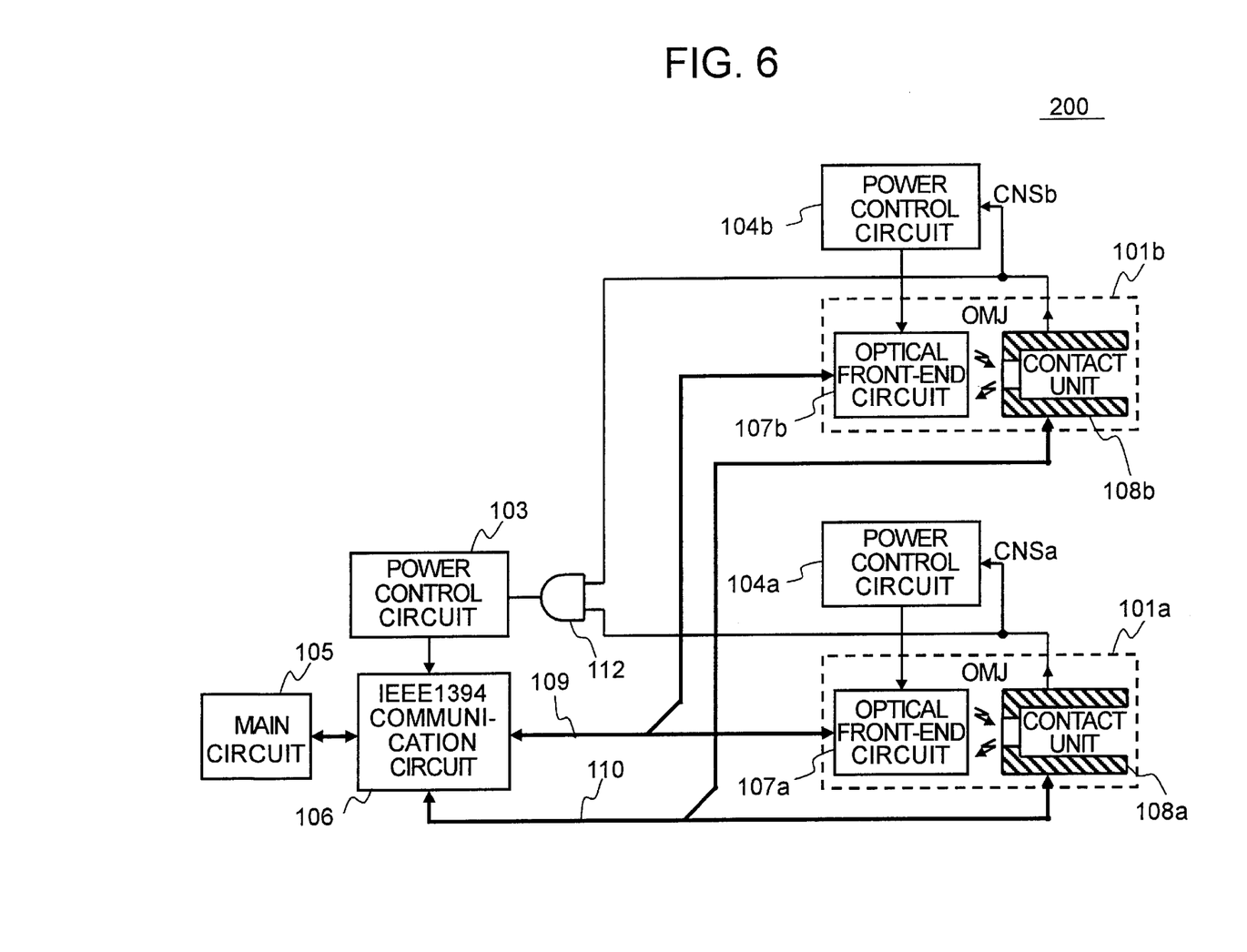
FIG. 6 is a block diagram representing a configuration of an electronic apparatus 200 in accordance with a second embodiment of the present invention.

FIG. 6 shows, as an example, a configuration of an electronic apparatus 200 having two communication ports.

Referring to FIG. 6, electronic apparatus 200 includes receptacles 101a and 101b corresponding to two communication ports, respectively. As in the first embodiment, receptacle 101a includes a contact unit 108a and an optical front-end circuit 107a. Similarly, receptacle 101b includes a contact unit 108b and an optical front-end circuit 107b. Power control circuits 104a and 104b are provided for respective receptacles. Configuration and operation of contact units 108a, 108b, optical front-end circuits 107a, 107b and power control circuits 104a and 104b are the same as those of the first embodiment. Therefore, description is not repeated.

Thus, connection detecting signals CNSa and CNSb are generated for respective receptacles, and power control is performed accordingly.

Electronic apparatus 200 further includes a power control circuit 103 controlling power supply to IEEE1394 communication circuit 106, and a logic gate 112 generating a signal dependent on the state of connection at each receptacle. It is possible for IEEE1394 communication circuit 106 to communicate each of receptacles 101a and 101b, by signal lines 109 and 110.

Logic gate 112 performs an AND operation of connection detecting signals CNSa and CNSb output from respective receptacles, and applies the result of operation to power control circuit 103. In response to the output signal from logic gate 112, power control circuit 103 stops supply of power to IEEE1394 communication circuit 106, when none of the communication ports, that is, none of the receptacles, is in the state of connection.

Control of power supply to optical front-end circuits 107a and 107b of respective receptacles is performed by power control circuits 104a and 104b provided for respective receptacles. Therefore, power consumption can efficiently saved, as the power supply to the port to which the cable is not connected is shut out.

FIG. 6 shows an example in which there are two communication ports. Even when there are three or more ports, similar effects can be obtained by arranging a power control circuit corresponding to each receptacle and IEEE1394 communication circuit 106, with the connection detecting signals output from respective receptacles supplied as inputs to logic gate 112.

Even when there is only one port, power control circuits corresponding to IEEE1394 communication circuit 106 and optical front-end circuit 107 can be provided independently.

Other configuration of power control circuit 103 provided corresponding to IEEE1394 communication circuit 106 will be described.

Figure 7:
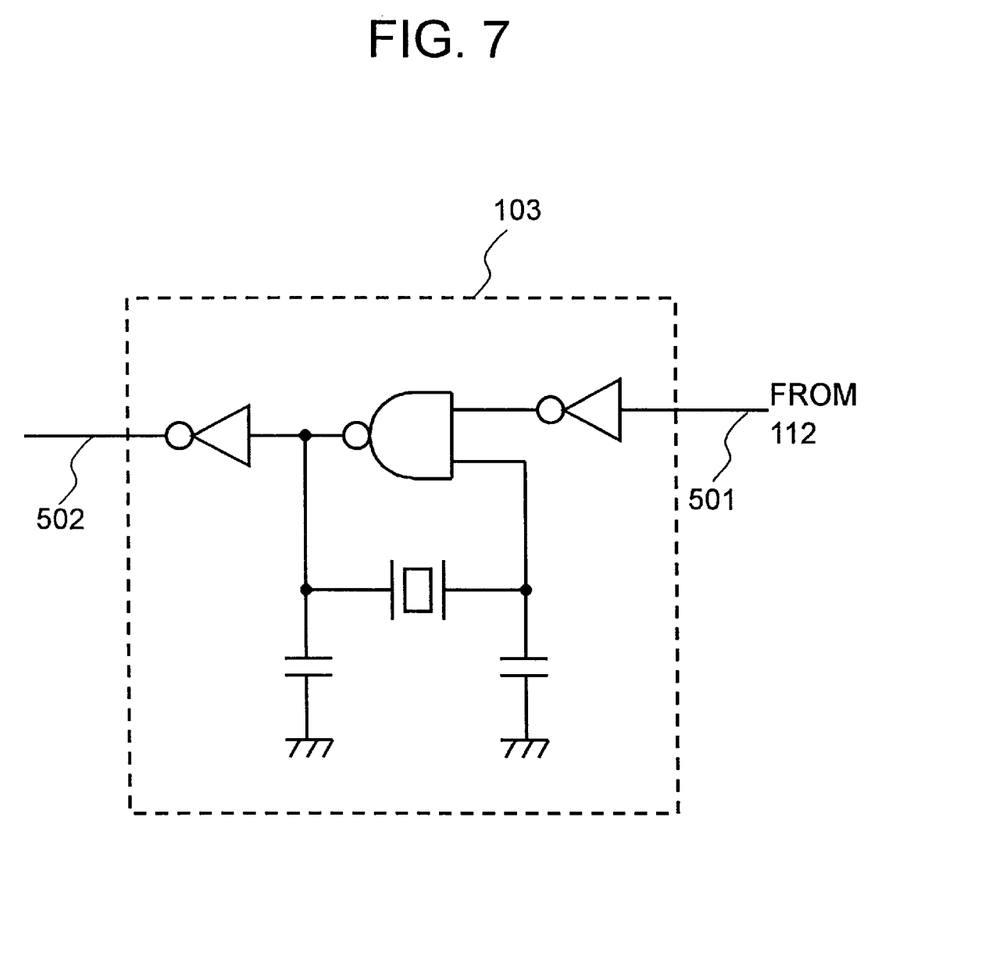
FIG. 7 is a circuit diagram showing another configuration of the power control circuit.

Power control circuit 103 may have the similar structure as power control circuit 104 shown in FIG. 5. It is possible, however, that the circuit is configured as shown in FIG. 7 in which clock supply to a digital circuit included in IEEE1394 communication circuit 106 is stopped. Though not shown in detail, in this example, the power is constantly supplied to IEEE1394 communication circuit 106.

Referring to FIG. 7, power control circuit 103 outputs a clock signal for IEEE1394 communication circuit 106 at an output node 502, in response to an output signal from logic gate 112 provided at control node 501.

Because of this structure, when a communication cable is not connected to any of the communication ports, the signal level at control node 501 attains to the H level, and the output of the NAND gate attains to the L level regardless of the output of an oscillating element. Therefore, oscillation of power control circuit 103 is stopped and signal level at output node 502 becomes constant. Thus, the clock signal is not supplied to IEEE1394 communication circuit 106.

Power control circuit 103 shown in FIG. 7 is a general purpose oscillation circuit with a control terminal (corresponding to control node 501), including a quartz oscillator, a capacitor, an NAND logic gate and an inverter, and therefore the principal of operation thereof is not described here. In a CMOS circuit, the higher the clock frequency, the larger the is connected to the communication ports, power consumption of the overall electronic apparatus can efficiently be reduced. The configuration of power control circuit 103 based on the clock control shown in FIG. 7 may be applicable to electronic apparatus 100 in accordance with the first embodiment, as a power control circuit provided corresponding to IEEE1394 communication circuit 106, if power control circuits corresponding to IEEE1394 communication circuit 106 and optical front-end circuit 107 are provided independent from each other.

In this manner, when power control is performed by controlling supply of digital clock signal, power consumption can efficiently be reduced without the necessity of a large current control element in the power control circuit, while the communication circuit is kept in a standby state.

Further, power control can be performed independently for the optical front-end circuit included in each of the plurality of ports. Therefore, efficient power control of the optical front-end circuit, which consumes considerable power in the communication circuit unit, becomes possible.

Third Embodiment

Figure 8:
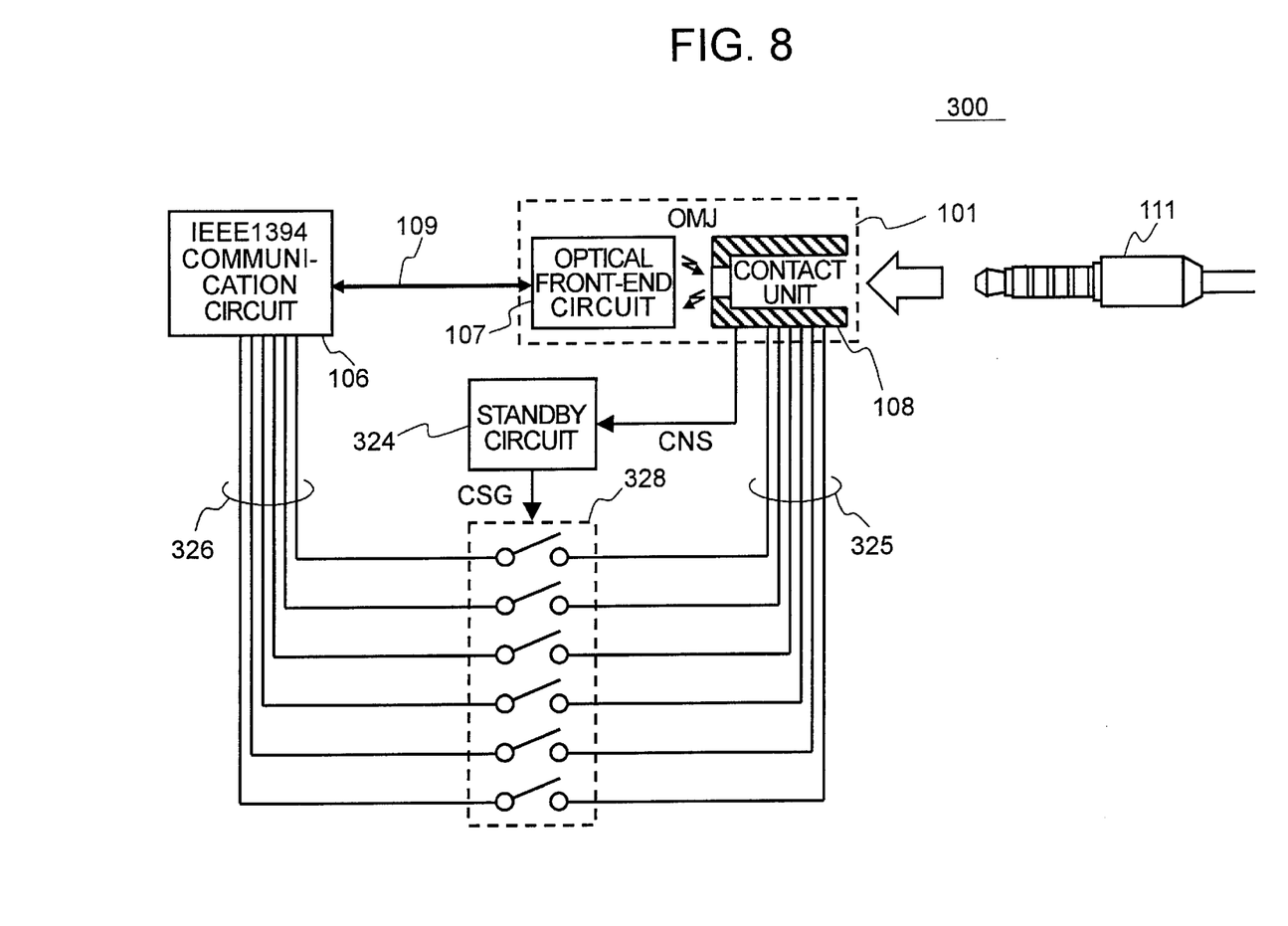
FIG. 8 is a block diagram representing a configuration of an electronic apparatus 300 in accordance with a third embodiment of the present invention.

FIG. 8 is a block diagram representing a configuration of an electronic apparatus 300 in accordance with the third embodiment of the present invention.

Referring to FIG. 8, electronic apparatus 300 differs from electronic apparatus 100 shown in FIG. 1 in that in place of signal line 110 between contact unit 108 and IEEE1394 communication circuit 106, signal lines 325 and 326 and a switch circuit 328 arranged therebetween and a standby circuit 324 controlling switching circuit 328 are provided. In order to show the details of connection control between the OMJ and IEEE1394 communication circuit 106, main circuit 105 is not shown in FIG. 8.

Figure 9A:
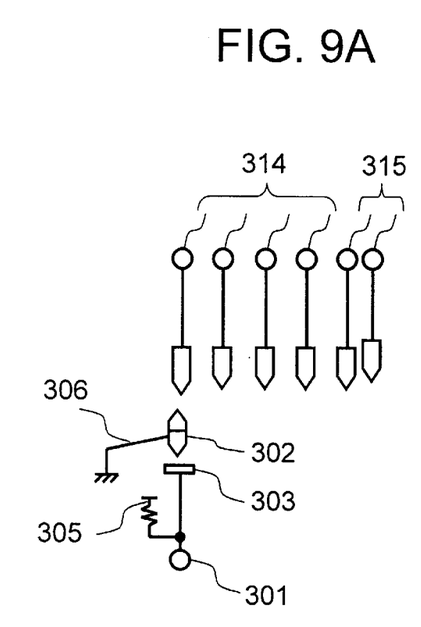
FIGS. 9A and 9B represent configurations of an electric contact unit of the OMJ.
Figure 9B:
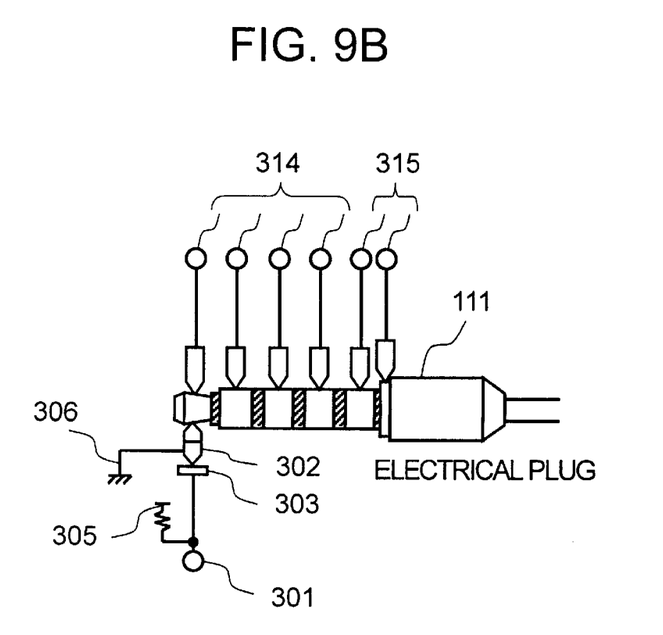

FIG. 9A shows the state of the contact unit when the plug is not inserted, and FIG. 9B shows the state of the contact unit when the plug is inserted. The configuration of contact unit 108 is the same as that shown with reference to FIGS. 3A and 3B, and therefore, detailed description thereof is not repeated. Of the terminals 314 and 315 shown in FIGS. 9A and 9B, 314 denotes a signal terminal corresponding to four signal lines in accordance with IEEE1394, and 315 denotes a power supply terminal including the ground. The terminals 314 and 315 are connected to IEEE1394 communication circuit 106 through signal line 325, switch 328 and signal line 326.

As shown in FIGS. 9A and 9B, the connection detecting signal CNS is generated at terminal 301, in the similar manner as described with reference to FIGS. 3A and 3B. The connection detecting signal CNS is the signal for detecting full insertion of the plug into the receptacle. Therefore, when the plug is fully inserted to the receptacle, the connection detecting signal CNS attains to the L level, and otherwise, H level.

Standby circuit 324 activates a control signal CSG after a prescribed standby time after the transition of the connection detecting signal CNS from the H level to the L level, and turns on switch 328. In the period while the connection detecting signal CNS is maintained at the L level, standby circuit 324 generates the control signal CSG so as to maintain the on state of switch 328. Thereafter, simultaneously with the transition of connection detecting signal to the H level, standby circuit 324 inactivates the control signal CSG and opens the switch 328. Standby circuit 324 may be implemented by using a digital timer or an analog element having a time constant. Generally, standby time of about 300 ms to about 400 ms is desirable.

Switch circuit 328 may be implemented by a mechanical relay circuit or an electrical semiconductor circuit.

IEEE1394 communication circuit 106 is as described above.

IEEE1394 communication circuit 106 is connected to optical front-end circuit 107 through signal line 109, and connected to contact unit 108 through signal lines 325 and 326 as well as switch 328, as described above.

Therefore, when a plug for an optical fiber is inserted, communication is performed with the optical front-end circuit 107 through signal line 109, and when a plug used for an electric cable is inserted, communication is performed between contact unit 108 and IEEE1394 communication circuit 106 through switch 328 and signal lines 325 and 326. As the fiber optic plug does not have any electric terminal, the problem as discussed in the prior art is not generated. Therefore, description for the use of fiber optic plug is not given here.

When an electric plug is inserted to OMJ101, before the plug is fully inserted, movable contact 302 and fixed contact 303 shown in FIG. 9A are separated, and the connection detecting signal CNS is at the H level. Thereafter, when plug 111 is almost fully inserted, movable contact 302 and fixed contact 303 are brought into contact and the connection detecting signal CNS changes to the L level. Standby circuit 324 operates and after a prescribed time period, switch circuit 328 is turned on, whereby power and the signal of plug 111 are connected to IEEE1394 communication circuit 106 through OMJ1 and switch circuit 328.

From the start to the end of insertion of plug 111, electrodes of plug 111 may be in contact with electrodes other than the corresponding electrodes of OMJ101. Switch circuit 328, however, is opened, and therefore the power or the signal of plug 111 is not supplied to IEEE1394 communication circuit 106. When plug 111 is almost fully inserted and fixed contact 303 and movable contact 302 of FIG. 9A are brought into contact, signal terminal 314 or power supply terminal 315 is almost reaching the corresponding prescribed electrode of plug 111. In the short period until the plug is fully inserted, however, each electrode on the side of the OMJ is slid over the corresponding electrode on the side of the plug, causing unstable state of the electrode (bouncing, chattering). The period of this unstable contact state is short, and therefore, IEEE1394 communication circuit 106 and plug 111 can be connected electrically after the end of this period of unstable state if standby circuit 324 maintains switch 328 open for the standby time period.

More specifically, when electrodes of plug 111 and OMJ 101 are in contact with electrodes not corresponding to each other or in the unstable period at the end of insertion, signals from plug 111 and IEEE1394 communication circuit 106 are not electrically connected, and all the electrodes are connected simultaneously by means of switch 328 after the insertion is completed and the signals are stabilized. Therefore, the signal terminals will never be connected before the ground is connected. Thus, there is no possibility of damaging the transmitting device or the receiving device in IEEE1394 communication circuit 106. Further, unexpected data will never be input in the course of inserting the plug to IEEE1394 communication circuit 106. Therefore, the state of operation of IEEE1394 communication circuit 106 is not affected.

Application of a small single head plug in this manner reduces area occupied by the receptacle of the surface area of the apparatus, which contributes to reduction in size of the electronic apparatus.

Though an example of a plug having a power supply terminal has been described in the third embodiment, a plug and a receptor with a signal line only and not including the power supply terminal may be used in accordance with IEEE1394 standard. The configuration of the present invention is similarly applicable to such an example.

Though a configuration in accordance with IEEE1394 standard has been described in the first to third embodiments, the present invention is also applicable to electronic apparatuses using other communication standards, such as USB (Universal Serial Bus).

In an apparatus of which specification does not involve use of an optical fiber, use of the OMJ is unnecessary. Therefore, the invention in accordance with the first to third embodiments may be applied to an ordinary mini jack.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic apparatus to which a communication cable is attachable and detachable, comprising:
    a main circuit of said electronic apparatus;
    a first detecting unit detecting a state of connection of said communication cable;
    a first communication unit communicating a signal with said communication cable;
    a second communication unit communicating said signal between said first communication unit and said main circuit; and
    a first power control unit controlling power supply to said first and second communication unit, based on a result of detection by said first detecting unit.

2. The electronic apparatus according to claim 1, further comprising:
    a receptacle for receiving a plug of said communication cable inserted thereto; wherein
        said receptacle generates a connection detecting signal having a signal level corresponding to said state of connection, and
        said first detecting unit is included in said receptacle.

3. The electronic apparatus according to claim 2, wherein
    said receptacle is capable of handling an optical signal and an electrical signal, provided through said plug for the optical signal and said plug for the electrical signal, said plugs having identical shape.

4. The electronic apparatus according to claim 1, wherein said first power control unit includes a clock generating circuit supplying or stopping operation clock to said first and second communication unit, dependent on said state of connection.

5. The electronic apparatus according to claim 1, wherein said first power control unit includes a switch circuit provided between a power supply node and said first and second communication unit, and operating in response to said state of connection.

6. The electronic apparatus according to claim 1, wherein at least an optical fiber is used as said communication cable; said electronic apparatus further comprising:
    an optical front-end circuit communicating an optical signal between said optical fiber and said first communication unit; wherein said first power supply control unit further controls power supply to said optical front-end unit, based on the result of detection by said first detecting unit.

7. The electronic apparatus according to claim 1, wherein:
    said first communication unit includes an optical front-end circuit performing at least one of a conversion from light to electricity and a conversion from electricity to light, and
    said second communication unit includes a control circuit performing communication control.

8. An electronic apparatus to which a communication cable is detachable and attachable, comprising:
    a receptacle receiving a plug of said communication cable inserted thereto;
    a detecting unit detecting a state of insertion between said plug and said receptacle;
    a communication unit communicating a signal to and from said communication cable; and
    a switch unit provided for communicating said signal between said receptacle and said communication unit, and turning on and off based on the result of detection by said detecting unit.

9. The electronic apparatus according to claim 8, wherein said switch unit connects said receptacle with said communication unit when insertion of said plug is detected, and
    said switch unit disconnects said receptacle and said communication unit when insertion of said plug is not detected.

10. The electronic apparatus according to claim 8, wherein
    said detecting unit is included in said receptacle.

11. The electronic apparatus according to claim 8, wherein
    said plug is a miniature concentric plug, and
    said receptacle corresponds to said miniature concentric plug.

12. The electronic apparatus according to claim 8, wherein said receptacle is capable of handling an optical signal and an electric signal, provided through plugs of an identical shape.

13. An electronic apparatus to which a communication cable is attachable and detachable, comprising:
    a first detecting unit detecting a state of connection of said communication cable;
    a communication unit communicating a signal with said communication cable; and
    a first power control unit controlling power supply to said communication unit, based on a result of detection by said first detecting unit, wherein said first power control unit includes a clock generating circuit supplying or stopping operation clock to said communication unit, dependent on said state of connection.

14. An electronic apparatus to which a communication cable is attachable and detachable, comprising:
    a first detecting unit detecting a state of connection of said communication cable;
    a communication unit communicating a signal with said communication cable; and a first power control unit controlling power supply to said communication unit, based on a result of detection by said first detecting unit, wherein
at least an optical fiber is used as said communication cable;
said electronic apparatus further comprising
an optical front-end circuit communicating an optical signal between said optical fiber and said communication unit, and
a second power control unit controlling power supply to said optical front-end circuit based on the result of detection by said first detecting unit; wherein said first power control unit includes a clock generating circuit supplying or stopping operation clock to said communication unit dependent on said state of connection.

15. An electronic apparatus to which a communication cable is detachable and attachable, comprising:
a first detecting unit detecting a state of connection of said communication cable;
a communication unit communicating a signal with said communication cable; and
a first power control unit controlling power supply to said communication unit, based on a result of detection by said first detecting unit, wherein
at least an optical fiber is used as said communication cable;
said electronic apparatus further comprising
a plurality of communication ports each capable of communicating a signal through said communication cable, and
a plurality of front-end circuits provided corresponding to said plurality of communication ports respectively, for transmitting/receiving an optical signal between said optical fiber and said communication unit; wherein
said first detecting unit is arranged for each communication port;
said electronic apparatus further comprising a plurality of second power control units provided corresponding to said plurality of optical front-end circuits respectively, controlling power supply to corresponding one of said optical front-end circuits based on the result of detection by corresponding said first detecting unit.

16. The electronic apparatus according to claim 15, wherein each of the plurality of second power control units stops power supply to corresponding said optical front-end circuit when said communication cable is not connected to corresponding said communication port.

17. An electronic apparatus according to claim 15, further comprising
a second detecting unit detecting said communication cable not connected to any of said plurality of communication ports, based on the result of detection by each of said first detecting units; wherein
said first power control unit stops power supply to said communication unit when said communication cable is not connected to any of said plurality of communication ports, based on the result of detection by said second detecting unit.

18. An electronic apparatus to which a communication cable is detachable and attachable, comprising:
a receptacle receiving a plug of said communication cable inserted thereto;
a detecting unit detecting state of insertion between said plug and said receptacle;
a communication unit communicating a signal to and from said communication cable;
a switch unit provided between said receptacle and said communication unit, and operating based on the result of detection by said detecting unit; and
a standby unit activating a control signal after a prescribed time from a timing at which said insertion is detected; wherein said switch unit disconnects or connects said receptacle and said communication unit, in accordance with said control signal.

* * * * *